3,139,350
TRIAZINE DERIVATIVES
Leo G. Valenzin, Via dell'Elettricita 4, Venice-Marghera, Italy
No Drawing. Filed Oct. 9, 1961, Ser. No. 143,576
9 Claims. (Cl. 106—15)

The present invention relates to new and useful triazine derivatives. More particularly, it relates to the production of triazines of the general formula

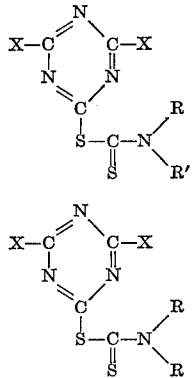

wherein each X is selected from the group consisting of chlorine, bromine and

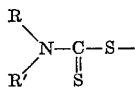

and wherein R and R' each represent a monovalent radical selected from the group consisting of hydrogen, alkyl, alkylene, aryl and aralkyl, and to coatings and coating compositions containing such triazine derivatives.

The new triazines of the present invention are produced by reacting cyanuric chloride or bromide with a dithiocarbamate of the general formula

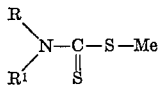

wherein R and R¹ each represent hydrogen or alkyl, alkylene, aryl, or aralkyl groups and Me represents a salt forming atom or group, for example an alkali metal, alkaline earth metal, ammonium, or other metal or metalloid. The reaction proceeds readily at atmospheric pressure when the reactants are brought together at temperatures between about 60° C. and 90° C., and if the reactants are vigorously stirred or mixed preferably in a liquid medium such as alcohols, ketones, aromatic or other aliphatic solvents or water. The new products are separated by pouring the reaction mixture into a dilute aqueous and preferably slightly alkaline solution, filtering the resulting mixture and washing and drying the solid precipitate collected by filtration.

All of the products of the present invention are yellow and melt between 130° C. and 180° C. They concurrently exhibit a combination of very pronounced bactericidal, fungicidal and antifouling and antimold properties and are particularly useful when incorporated into coatings such as paints, varnishes, enamels and similar compositions based on film forming constituents.

Specifically the products obtained in accordance with the present invention demonstrate a strong antibacterial activity for example against *Staphylococcus aureus* and *Escherichia coli*, as well as a lasting fungicidal activity against *Aspergillus oryzae*; *Trichoderma* sp.; *Aspergillus niger*; *Trichophyton metagrophytes*; *Candida albicans*; *Pullularia pullulans*; and similar fungi.

The following examples will serve to further illustrate the preparation and useful properties of preferred compounds of the present invention and are to be construed as illustrative rather than as limitative.

EXAMPLE 1

A solution of trichlorotriazine (cyanuric chloride) was prepared by dissolving 40 grams of the same in 200 cc. of acetone. One hundred grams of zinc dimethyldithiocarbamate was added to the solution and the mixture was vigorously stirred. After heating and refluxing, the suspension was poured into 500 to 1000 cc. of water containing 1% sodium bicarbonate. The yellow powder precipitate was readily recovered by filtering the mixture, and was washed on the filter and then dried.

Paints exhibiting excellent bactericidal and fungicidal properties were prepared by mixing 1 part of the yellow solid, by weight, with 99 parts of mixtures consisting of:

| | Percent |
|---|---|
| Polyvinyl emulsion | 25–35 |
| Pigments and extenders | 35–45 |
| Water and dispersing agent | 25–35 |

EXAMPLE 2

A solution of trichlorotriazine (cyanuric chloride) was prepared by dissolving 40 grams of the same in benzol. One hundred grams of sodium ethylene bis dithiocarbamate was added to the solution with vigorous stirring and the mixture was refluxed for several hours. The resulting suspension was poured into between 500 and 1000 cc. of water containing about 1% of sodium bicarbonate as a precipitant. The yellow solid product was separated by filtration, washed and dried.

The product was incorporated into paints of the following formulation:

| | Percent |
|---|---|
| Linseed oil | 25–35 |
| Pigments and extenders | 45–55 |
| Diluents and siccatives | 7–11 |
| Product of Example 2 | 1 |

The resulting paints had lasting bactericidal and fungicidal properties.

EXAMPLES 3–6

Similar products were prepared by reacting solutions of 40 grams cyanuric chloride with the indicated dithiocarbamate at about 60° C. for three to four hours.

| Example No. | Solvent | Dithiocarbamate (D.T.C.) | Weight of D.T.C., grams |
|---|---|---|---|
| 3 | benzol or ethanol | Zinc Ethylene bis D.T.C. | 100 |
| 4 | Cyclohexanone | Zinc Cyclohexyl D.T.C. | 120 |
| 5 | acetone | Potassium propylene bis D.T.C. | 200 |
| 6 | dioxane | Lithium-o-chlorphenyl bis D.T.C. | 200 |

The yellow products obtained by reacting each of the above were recovered in the same manner as in Example 1, and were then blended into coating compositions such as the following:

*Composition A*

| | Percent |
|---|---|
| Chlorinated rubber and chlorinated paraffins | 50 |
| Solvents | 30 |
| Pigments | 18.5 |
| Triazine derivative | 1.5 |

Composition B

| | Percent |
|---|---|
| Linseed oil | 40 |
| Pigments and extenders | 50 |
| Solvents and driers | 8.5 |
| Triazine derivative | 1.5 |

Composition C

| | |
|---|---|
| Alkyd resin | 50 |
| Pigments and extenders | 30 |
| Solvents and driers | 18 |
| Triazine derivative | 2 |

Using paints prepared with between about 1% and 2% by weight of the triazine compounds of this invention, it has been possible to maintain homes, hospitals, factories and the like free from germs, bacteria and mold.

Tests were made with latex emulsion paints comparing paints containing the triazine derivative prepared from cyanuric chloride and alkali metal dimethyldithiocarbamate, with paints which were otherwise similar except that they did not contain the triazine derivative. The tests were conducted as follows:

Strips of Whatman 1 paper were painted two coats of the paints and placed on agar plates previously inoculated with the microorganism in the table below. After 24 hours at 37° C., the average diameter of the zone surrounding the paper strip and free from microorganisms was measured. The results are reproduced in Table 1.

TABLE 1

| Microorganism Test | Average Diameter of the Inhibition Zone of the Growth in mm. | |
|---|---|---|
| | Control Paint | Paint Containing Triazine Deriv. |
| Staphylococcus aureus | 21 | 40 |
| Escherichia coli | 0 | 23 |
| Proteus vulgaris | 0 | 6, 5 |
| Candida albicans | 0 | 33 |

Using the same technique, the activity of the same triazine derivative was tested against the following fungi using Sabouraud agar plates.

| Mycetes Tested | Paint Containing Triazine Derivative | Paint Without Triazine Derivative |
|---|---|---|
| Aspergillus oryzae | 8 | 0 (Heavy growth). |
| Trichoderma sp | 4 | Do. |
| Aspergillus niger | 4 | Do. |
| Trichophyton mentagrophytes | 14 | Do. |

Having now described the invention in accordance with the Patent Statutes, it is not intended that it be limited except as required by the appended claims.

I claim:

1. A bactericidal, fungicidal, antimold and antifouling coating composition comprising a coating material normally subject to bacterial, fungic, mold and fouling attack, and at least approximately one percent by weight of an agent having the following general formula:

$$X-C\underset{N}{\overset{N}{\underset{\parallel}{=}}}\!\!\!\underset{}{\overset{}{C}}\!\!-\!X$$
$$\underset{}{\overset{}{\underset{N}{\parallel}}}\!\!\!\underset{}{\overset{}{C}}$$
$$S-C-N\!\!<\!\!\underset{R'}{\overset{R}{}}$$
$$\underset{}{\overset{}{\parallel}}$$
$$S$$

wherein each X is selected from the group consisting of Cl, Br and $$\underset{R'}{\overset{R}{}}\!\!>\!\!N-C-S-$$
$$\underset{}{\overset{}{\parallel}}$$
$$S$$

and each of R and R' is selected from the group consisting of hydrogen, alkyl, alkylene, aryl and aralkyl.

2. The composition of claim 1 wherein said agent is present in from about one to about two percent by weight.

3. The composition of claim 1 wherein said agent is the product of a reaction between a triazine selected from the group consisting of cyanuric chloride and cyanuric bromide, and a dithiocarbamate selected from the group consisting of zinc dimethyldithiocarbamate, sodium ethylene bis dithiocarbamate, zinc ethylene bis dithiocarbamate, zinc cyclohexyldithiocarbamate, potassium propylene bis dithiocarbamate and lithium-o-chlorophenyl bis dithiocarbamate.

4. The composition of claim 1 wherein said agent is the product of a reaction between cyanuric chloride and zinc dimethyldithiocarbamate.

5. The composition of claim 1 wherein said agent is the product of a reaction between cyanuric chloride and sodium ethylene bis dithiocarbamate.

6. The composition of claim 1 wherein said agent is the product of a reaction between cyanuric chloride and zinc ethylene bis dithiocarbamate.

7. The composition of claim 1 wherein said agent is the product of a reaction between cyanuric chloride and zinc cyclohexyldithiocarbamate.

8. The composition of claim 1 wherein said agent is the product of a reaction between cyanuric chloride and potassium propylene bis dithiocarbamate.

9. The composition of claim 1 wherein said agent is the product of a reaction between cyanuric chloride and lithium-o-chlorophenyl bis dithiocarbamate.

References Cited in the file of this patent

UNITED STATES PATENTS

| 2,061,520 | Orthner et al. | Nov. 17, 1936 |
| 2,615,887 | Zerner et al. | Oct. 28, 1952 |
| 2,631,148 | Nelb | Mar. 10, 1953 |
| 2,978,338 | Greathouse | Apr. 4, 1961 |
| 3,005,720 | Teller | Oct. 24, 1961 |
| 3,076,807 | Fancher et al. | Feb. 5, 1963 |

FOREIGN PATENTS

| 786,792 | Great Britain | Nov. 27, 1957 |
| 835,850 | Great Britain | May 25, 1960 |